H. V. BROWNE.
TRACTOR CAB.
APPLICATION FILED JULY 16, 1919.

1,341,355.

Patented May 25, 1920.
3 SHEETS—SHEET 1.

Inventor.
Henry V. Browne
by Lacey & Lacey,
his Attorneys

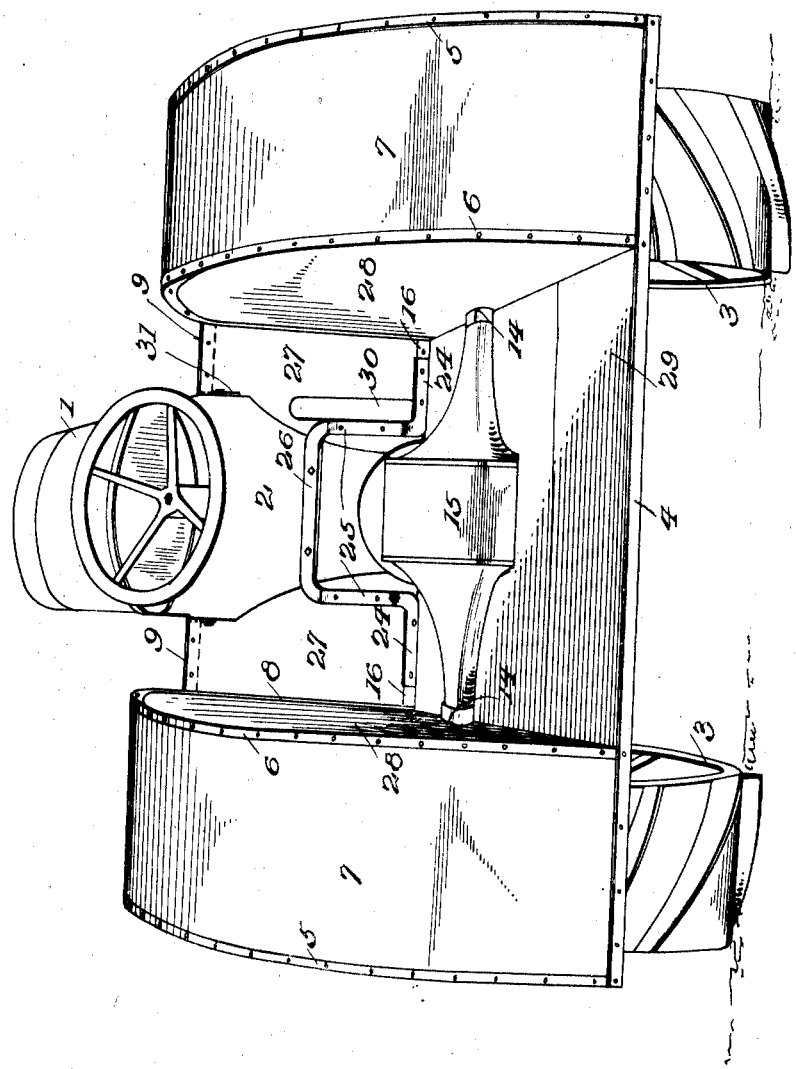

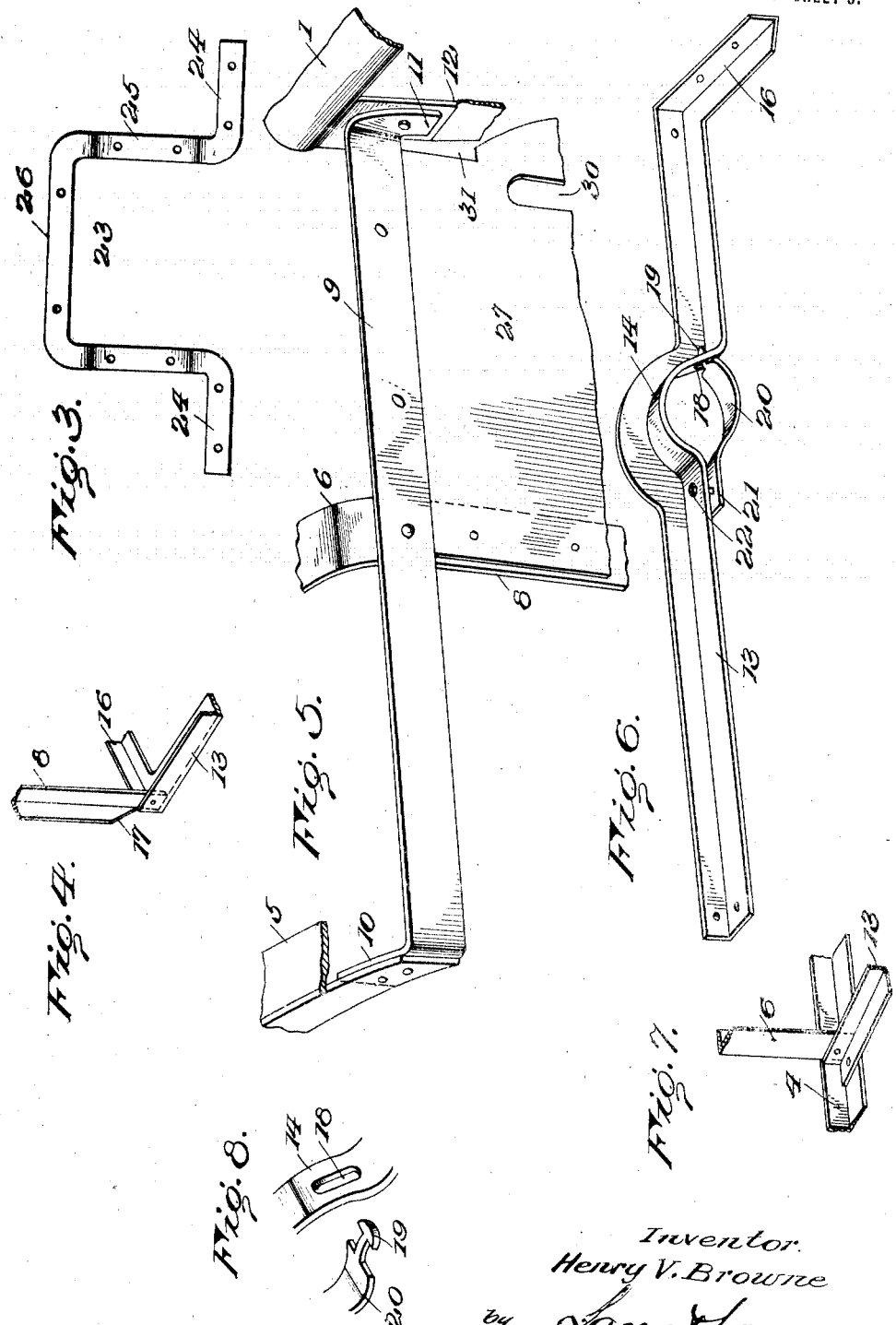

UNITED STATES PATENT OFFICE.

HENRY V. BROWNE, OF TONKAWA, OKLAHOMA, ASSIGNOR OF ONE-THIRD TO RUBEN J. MEAD, OF TONKAWA, OKLAHOMA.

TRACTOR-CAB.

1,341,355.      Specification of Letters Patent.      Patented May 25, 1920.

Application filed July 16, 1919. Serial No. 311,251.

*To all whom it may concern:*

Be it known that I, HENRY V. BROWNE, a citizen of the United States, residing at Tonkawa, in the county of Kay and State of Oklahoma, have invented certain new and useful Improvements in Tractor-Cabs, of which the following is a specification.

This invention seeks to provide means particularly adapted for application to small tractors whereby the operator will be protected from the dust rising from the tractor, and from accidental contact with the tractor wheels. The invention seeks to provide a device for the stated purpose which will be simple in construction and may be easily applied to the tractor by an unskilled person and easily removed therefrom for the purpose of repairing or renewing any part.

The invention is illustrated in the accompanying drawing, in which—

Fig. 2 is a rear view of the cab in position upon a tractor;

Fig. 3 is a detail view of an arch which serves to connect the front shield members to the dash of the tractor;

Fig. 4 is a detail perspective view of a joint employed in the frame of the cab at one of the lower front corners of the same;

Fig. 5 is a perspective view of a portion of the frame showing the means for connecting the wheel guards or fenders with the front shields;

Fig. 6 is a perspective view of that portion of the frame which passes around the axle or the transmission casing and supports the inner side member of a wheel fender;

Fig. 7 is a detail perspective view of one of the lower rear corners of the frame.

Fig. 8 is a detail of the means for accommodating the frame to the transmission case.

Figure 1:
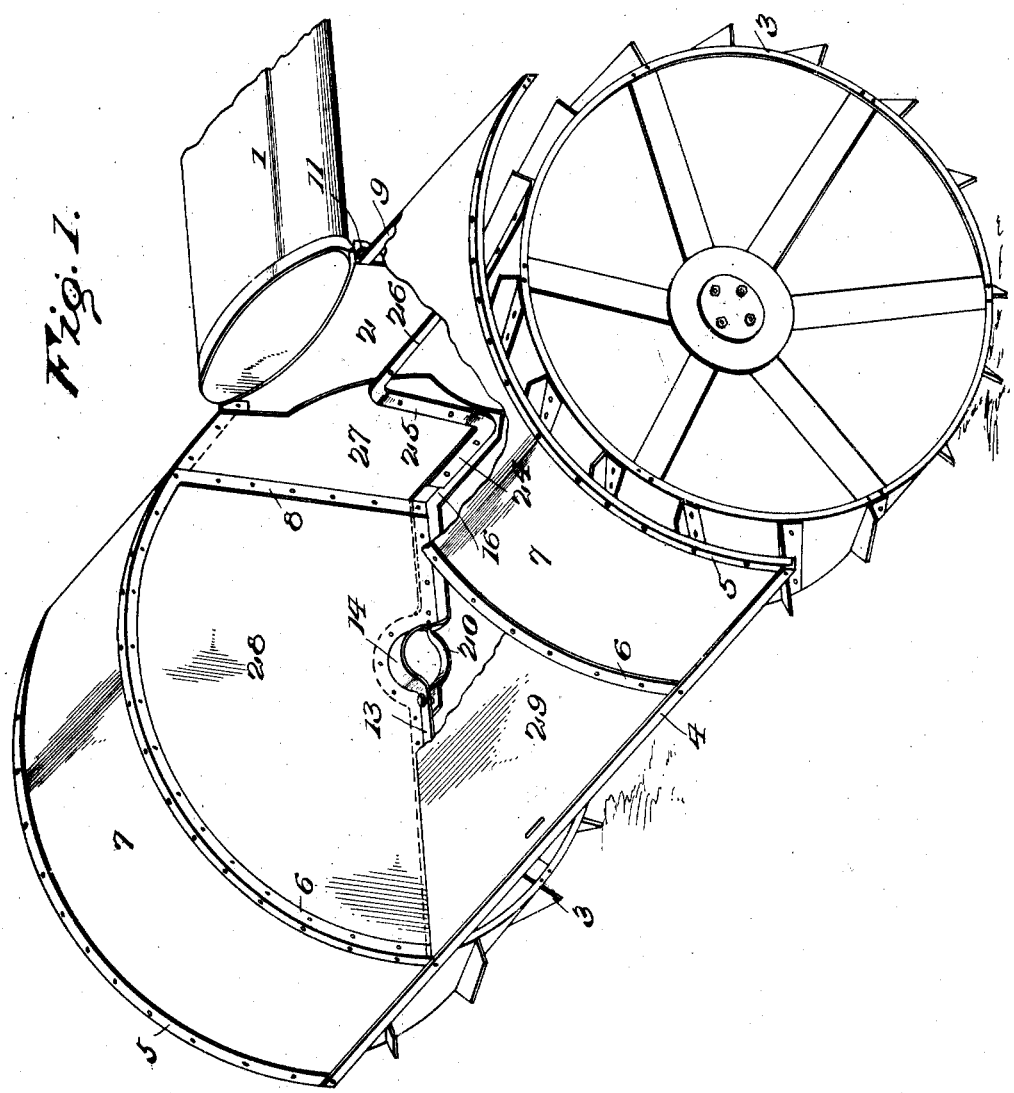
Figure 1 is a perspective view of so much of a tractor as is necessary to illustrate the invention, the improved cab or housing being shown in position with parts broken away.

In the drawings, the reference numeral 1 indicates the tank, 2 the dash, and 3 the driving wheels of the well-known Fordson tractor for application to which my invention is particularly designed. In carrying out the invention, I employ a frame-work composed principally of angle-iron bent, welded, or otherwise shaped into the desired forms. One of the base members of the frame-work is employed without alteration from its primary straight continuous form and constitutes the back member 4 of the frame. To the said back member 4, I rivet or bolt the arcuate bars 5 and 6 which are disposed in pairs and to which the wheel fenders or guards 7 are secured. The arcuate bars 5 are secured at their lower rear ends to the ends of the back member 4 somewhat beyond the outer sides of the wheels 3 and preferably are curved so as to lie approximately concentric with said wheels. The inner arcuate members 6 are secured to the back bar 4 of the frame at points spaced inwardly slightly from the vertical planes of the inner sides of the wheels 3 and are curved on the same radius as the bars 5. The bars 5, however, terminate at points in advance of and above the wheels while the bars 6 are continued downwardly in straight members 8 which are secured at their lower ends to one of the bottom members of the frame. A flat bar 9 is disposed at and secured to the front ends of the members 5 and 6 and projects inwardly beyond the members 6 to be secured to the dash 2 or to projections on the frame of the tractor. In the drawings, I have shown the outer end of the member 9 as turned rearwardly at a right angle, as shown at 10, to be rigidly secured to the front end of the vertically disposed web of the angle bar 5 while the inner end of the member 9 is turned downwardly and forwardly, as shown at 11, to be secured to a portion 12 of the tractor frame. Extending between the lower rear end of the member 6 and the lower end of the straight extension 8 of said member is a base bar 13 which is also of angle-iron and is provided intermediate its ends with an arched portion 14 to fit over the end of the transmission case 15 of the tractor. At the front extremity of the member 13 is a lateral branch 16 which extends inwardly at a right angle to the main portion of said base member and terminates adjacent the dash 2, as clearly shown in Figs. 1 and 2. The lower end of the longitudinally disposed web of the member 8 rests upon the horizontally disposed web of the member 13 and is riveted or bolted to the vertical web of said member, the transversely disposed web of said member 8 being cut away, as shown at 17, near its lower end so as to clear the said vertical web of the base member 13. The lower rear extremity of the arcuate member 6 rests upon the horizontal web of the back bar 4 and against the vertical web of the same, while the rear extremity of the base member 13 also rests upon the horizontal web of the back bar 4 and bears against the member 6 and the vertical web of the member 4, as clearly shown in Fig. 7. Neat and strong joints are thus provided at the corners of the frame. The forward wall of the arch 14 is constructed with a slot 18 through which may be inserted a T-shaped projection 19 on a bracket 20 which is substantially semi-cylindrical so as to pass under and fit to the end of the transmission casing and is provided with a rear lip 21 through which and the base member 14 a securing bolt 22 may be inserted. It will be readily understood that by disposing the T-shaped projection 19 so that the greater dimension of its head will be in alinement with the slot 18 said projection may be inserted through the slot and then the bracket given a quarter turn so as to bring the head across the slot and prevent disengagement of the parts. This construction facilitates the assembling of the device and reduces the number of bolts which must be employed and which are always more or less liable to work loose and be lost. Between the lateral branches 16 of the two base members 13, I arrange a bridge piece or connecting arch 23 which has lateral feet 24 adapted to rest upon and be secured to the said branches 16 and from the inner ends of these feet side members or standards 25 rise to be connected by the cross member 26 which is secured to the dash 2, using the screw or bolt holes provided for securing the tool box to the tractor dash. Shields 27 are disposed between the dash 2, at each side of the same, and the members 8 of the frame and these shields are secured to the inner portions of the bars 9 and to the side members of the arched bridge piece 23. They are also secured to the members 8, as shown most clearly in Fig. 5. Side plates 28 are fitted to the members 6, 8 and 13 and secured to the flanges or webs of the same so as to inclose the ground wheels 3 and prevent the dust which rises therefrom passing to the operator. A floor 29 is supported upon the inwardly projecting horizontal webs of the back bar 4 and the side base members 13 and this floor is composed of loose boards resting upon the horizontally disposed webs or flanges and suitably shaped to fit close to and around the transmission casing 15. One shield 27 is provided with a vertical slot or notch 30 to accommodate the clutch lever of the tractor and a recess 31 is also formed in said shield to accommodate the carbureter-controlling rod of the tractor.

As previously stated, the frame members are formed of angle bars with the exception of the front members 9 and the bridge piece 23. The wheel fenders or guards 7 and the side plates 28 are preferably formed of sheet metal so as to possess the requisite strength without excessive weight, while the floor will preferably be constructed of wooden planks of sufficient thickness to possess the needed strength without excessive weight. My improved cab or housing will effectually inclose the driving wheels and the parts connecting the same with the gearing of the tractor engine so that the dust from the tractor cannot reach the operator. The platform or floor is so located that ample clearance will be provided at the rear edge thereof for plows or other implements which are coupled to the tractor to be drawn over a field and the entire device may be removed from or applied to the tractor in a few minutes by unskilled labor.

Having thus described the invention, what is claimed as new is:

1. A cab for tractors comprising a supporting frame, vertically disposed side plates on said frame, a platform resting on the frame between said side plates, inwardly extending shields at the front ends of the side plates, and an arched bridge piece connecting said shields.

2. A cab for tractors comprising a supporting frame constructed to fit between the driving wheels of the tractor, a platform supported on said frame, side plates at the ends of the platform, inwardly extending shields at the front end of the platform and the front ends of the side plates, and means secured to said shields for connecting the shields and securing them to the tractor.

3. A cab for tractors comprising a supporting frame having longitudinally extending members provided with arched portions intermediate their ends, brackets attached to said longitudinally extending members below the arched portions and mating said portions, a platform extending between said members, side plates secured to and rising from said members, and shields carried by said members at the front ends of the side plates.

4. A cab for tractors comprising a back bar, arcuate bars secured to and rising from said bar at the ends of the same and at points spaced from the ends, longitudinally extending base members secured to the back bar at the junction of the same with the inner arcuate members, bars connecting said longitudinally extending base members with the upper front ends of the inner arcuate bars, side plates secured to the base members, the said inner arcuate members, and the bars connecting said arcuate bars with the base members, arched plates secured to and extending between the respective inner and outer arcuate members, front bars connecting the arcuate bars with each other and to the tractor, and a platform resting upon and extending between the longitudinally extending base members.

5. A cab for tractors comprising a frame having longitudinally extending base members provided with inwardly extending lateral branches at their front ends, wheel guards supported by and above the said base members, a platform extending between and resting on said base members, shields rising from the lateral branches of said base members, bars connecting the upper ends of the shields with the wheel guards and with the tractor, and a bridge piece connecting the lateral branches of the base members and the shields with the tractor.

6. A cab for tractors comprising longitudinal base bars having inwardly extending lateral branches at their front ends and provided with arched portions intermediate their ends, said arched portions having longitudinal slots in their front sides, dished brackets provided at their front ends with T-shaped projections to engage said slots, means for securing the rear ends of said brackets to the base bars in rear of the arched portions thereof, a back bar connecting the rear ends of the base bars and extending laterally beyond the same, a platform carried by the base bars and the back bar, wheel guards carried by the base bars and the end portions of the back bar, said platform fitting around a transmission case and the ends of the transmission case being received between the arched portions of the base bars and the brackets below said portions, shields projecting inwardly from the front ends of the wheel guards and supported by the same and the base bars, said shields being constructed to fit against the tractor frame, and a bridge piece connecting the shields and secured to the tractor frame.

In testimony whereof I affix my signature.

HENRY V. BROWNE. [L. S.]